(12) United States Patent
Ueno

(10) Patent No.: US 11,997,243 B2
(45) Date of Patent: May 28, 2024

(54) INFORMATION MANAGEMENT METHOD AND IMAGE FORMING APPARATUS FOR OBTAINING EVALUATION OF USER FOR OPTIONAL FUNCTION OF THE IMAGE FORMING APPARATUS

(71) Applicant: SEIKO EPSON CORPORATION, Tokyo (JP)

(72) Inventor: Kikuo Ueno, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/059,007

(22) Filed: Nov. 28, 2022

(65) Prior Publication Data
US 2023/0171364 A1    Jun. 1, 2023

(30) Foreign Application Priority Data
Nov. 30, 2021   (JP) .................................. 2021-194337

(51) Int. Cl.
*H04N 1/44*   (2006.01)
*H04N 1/00*   (2006.01)

(52) U.S. Cl.
CPC ....... *H04N 1/4433* (2013.01); *H04N 1/00474* (2013.01); *H04N 1/00514* (2013.01); *H04N 2201/0094* (2013.01)

(58) Field of Classification Search
CPC ............. H04N 1/4433; H04N 1/00474; H04N 1/00514; H04N 2201/0094
See application file for complete search history.

(56) References Cited

U.S. PATENT DOCUMENTS

| | | | | |
|---|---|---|---|---|
| 2013/0057896 A1* | 3/2013 | Ito | ......... | H04N 1/4433 358/1.14 |
| 2014/0211219 A1* | 7/2014 | Yabe | .................... | H04N 1/4433 358/1.5 |
| 2015/0264198 A1* | 9/2015 | Kamiya | ............. | H04N 1/00204 358/1.13 |
| 2016/0065777 A1* | 3/2016 | Oikawa | ................ | H04N 1/2166 358/1.16 |
| 2016/0381243 A1* | 12/2016 | Manabe | ............. | H04N 1/00962 358/1.15 |
| 2018/0081608 A1* | 3/2018 | Tamura | ............. | H04N 1/00244 |
| 2020/0036857 A1* | 1/2020 | Kato | ................. | H04N 1/00204 |

FOREIGN PATENT DOCUMENTS

| | | |
|---|---|---|
| JP | 2010004441 A | 1/2010 |
| JP | 2012058765 A | 3/2012 |

* cited by examiner

*Primary Examiner* — Nicholas Pachol
(74) *Attorney, Agent, or Firm* — CHIP LAW GROUP (57) ABSTRACT

A multifunction peripheral includes a control unit that, when a registered user is using the multifunction peripheral, causes an operation panel to display information concerning an optional function that can be added to the multifunction peripheral, receives, with the operation panel, an evaluation of the user for the optional function, when receiving, with a communication I/F, an acquisition request for an evaluation for the optional function, generates an evaluation result obtained by aggregating evaluations of a plurality of registered users, and transmits the generated evaluation result to a transmission source of the acquisition request.

7 Claims, 9 Drawing Sheets

| USER ID | PASSWORD | ADMINISTRATOR INFORMATION |
|---|---|---|
| 123456 | abcdefg | ADMINISTRATOR |
| 334455 | opqrstu | — |
| ⋮ | ⋮ | ⋮ |

*FIG. 3*

| FUNCTION | A EVALUATION | | B EVALUATION | | C EVALUATION | |
|---|---|---|---|---|---|---|
| FUNCTION F1 | 25 | USER ID 123456 334455 ... | 10 | USER ID 666666 432109 ... | 5 | USER ID 999999 888888 ... |
| FUNCTION F2 | 4 | USER ID 000000 111111 ... | 28 | USER ID 543543 432432 ... | 0 | USER ID — |
| ... | ... | ... | ... | ... | ... | ... |

INFORMATION MANAGEMENT METHOD AND IMAGE FORMING APPARATUS FOR OBTAINING EVALUATION OF USER FOR OPTIONAL FUNCTION OF THE IMAGE FORMING APPARATUS

The present application is based on, and claims priority from JP Application Serial Number 2021-194337, filed Nov. 30, 2021, the disclosure of which is hereby incorporated by reference herein in its entirety.

BACKGROUND

1. Technical Field

The present disclosure relates to an information management method and an image forming apparatus.

2. Related Art

There has been known a technique for presenting an effect obtained when an optional function is added to an image forming apparatus.

For example, JP-A-2010-4441 (Patent Literature 1) discloses an optional function information processing apparatus that determines whether a mountable optional function is mounted, acquires an effect obtained when the optional function determined as unmounted is mounted, and displays the acquired effect of the optional function.

However, a person who can determine necessity of the optional function is a user who uses the image forming apparatus in regular work. The user sometimes does not agree with an administrator who determines whether to purchase the optional function.

SUMMARY

An aspect of the present disclosure is directed to an information management method including: determining whether login information input from a receiving unit of an image forming apparatus is login information of a registered user; when the login information is the login information of the registered user, causing a display unit of the image forming apparatus to display information concerning an optional function that is added to the image forming apparatus; receiving, with the receiving unit, an evaluation of the user for the displayed optional function; when receiving, with a communication unit of the image forming apparatus, an acquisition request for an evaluation for the optional function, generating an evaluation result obtained by aggregating evaluations of a plurality of registered users; and transmitting the generated evaluation result to a transmission source of the acquisition request.

An aspect of the present disclosure is directed to an image forming apparatus including: a communication unit configured to perform communication with another apparatus via a network; a receiving unit configured to receive operation; a display unit; and a control unit. The control unit executes: determining whether login information received by the receiving unit is login information of a registered user; when the login information is the login information of the registered user, displaying, on the display unit, information concerning an optional function that is added to the image forming apparatus; receiving, with the receiving unit, an evaluation of the user for the optional function displayed on the display unit; when receiving, with the communication unit, an acquisition request for an evaluation for the optional function, generating an evaluation result obtained by aggregating evaluations of a plurality of registered users; and transmitting the generated evaluation result to a transmission source of the acquisition request.

DESCRIPTION OF EXEMPLARY EMBODIMENTS

An embodiment of the present disclosure is explained with reference to the accompanying drawings.

Figure 1:
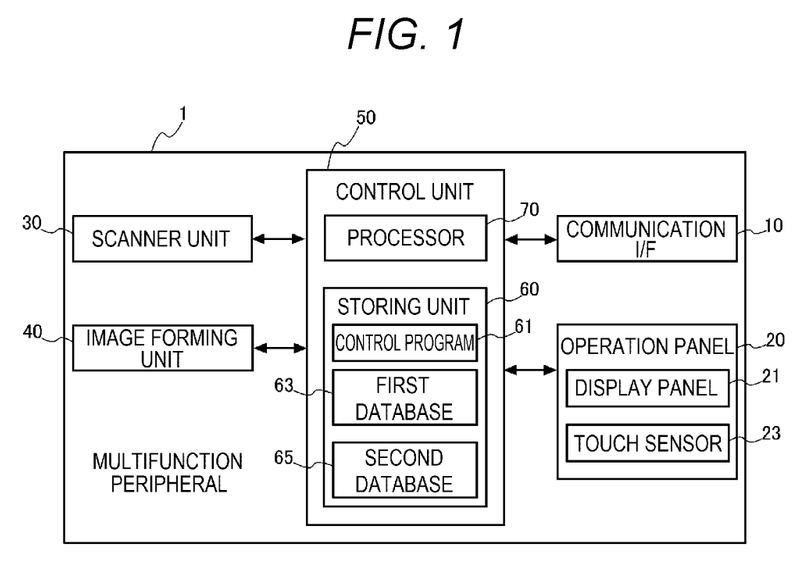
FIG. 1 is a block diagram showing the configuration of a multifunction peripheral.

FIG. 1 is a block diagram showing the configuration of a multifunction peripheral 1 applied with the present disclosure. The multifunction peripheral 1 is equivalent to the image forming apparatus.

The multifunction peripheral 1 includes a communication interface 10, an operation panel 20, a scanner unit 30, an image forming unit 40, and a control unit 50. In the following explanation, interface is abbreviated as I/F.

The communication I/F 10 is equivalent to the communication unit. The communication I/F 10 is a wired interface including a terminal such as a USB (Universal Serial Bus) connector or an Ethernet connector and an interface circuit. The communication I/F 10 may be an interface for wireless communication. Ethernet is a registered trademark.

The operation panel 20 is equivalent to the display unit and the receiving unit. The operation panel 20 includes a display panel 21 and a touch sensor 23 and functions as a touch panel for receiving touch operation of a user. For example, a liquid crystal panel or an organic EL (Electro Luminescence) panel is used as the display panel 21. The touch sensor 23 is disposed over the display panel 21 and detects the touch operation on the operation panel 20. The touch sensor 23 detects, as the touch operation, a position of the operation panel 20 that a finger of the user touches. The touch sensor 23 outputs, to the control unit 50, an operation signal including coordinate information indicating the detected position of the operation panel 20. The operation panel 20 may include hardware buttons.

The scanner unit 30 reads an image of a document placed on a document stand and outputs image data, which is data of the read image, to the control unit 50.

The image forming unit 40 prints, on a recording medium, an image based on the image data input from the control unit 50.

The control unit 50 is a computer device including a storing unit 60 and a processor 70.

The storing unit 60 includes a volatile memory such as a RAM (Random Access Memory) and a nonvolatile memory such as a ROM (Read Only Memory).

The storing unit 60 stores a control program 61 to be executed by the processor 70, a first database 63, a second database 65, and various kinds of setting information.

Figure 2:
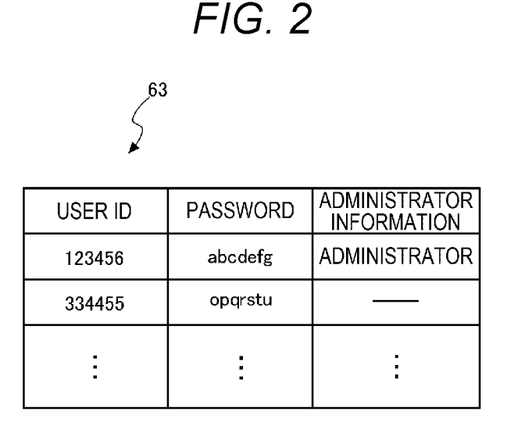
FIG. 2 is a diagram showing an example of the configuration of a first database.

FIG. 2 is a diagram showing an example of the configuration of the first database 63.

One record of the first database 63 includes a user ID, a password, and administrator information. In the following explanation, a user who registers the user ID and the password in the first database 63 in advance is referred to as registered user. In the following explanation, the user ID and the password are collectively referred to as login information.

The administrator information is information for identifying a user registered as an administrator. In a record of the user registered as the administrator, the administrator information indicating that the user is the administrator is recorded. The administrator information is not recorded in a record of a user not registered as the administrator.

Figure 3:
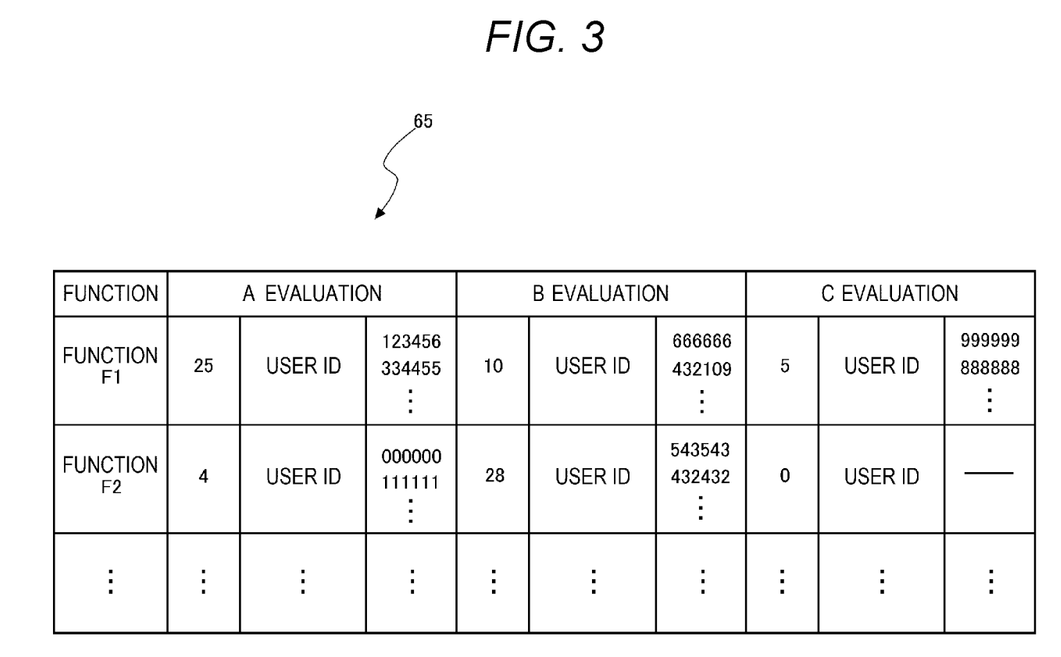
FIG. 3 is a diagram showing an example of the configuration of a second database.

FIG. 3 is a diagram showing an example of the configuration of the second database 65.

One record of the second database 65 includes a function name of an optional function that can be added to the multifunction peripheral 1 and evaluation results of users for the optional function having the function name. The evaluation results include evaluation values indicating necessity degrees of the optional function evaluated by the users. In this embodiment, three evaluation values of an A evaluation, a B evaluation, and a C evaluation are recorded in the second database 65 as the evaluation values. In the following explanation of this embodiment, three stages of the A evaluation, the B evaluation, and the C evaluation are recorded as the evaluation values. However, the evaluation values may be two stages or may be four or more stages.

The A evaluation indicates an evaluation that the necessity degree of the optional function is "absolutely necessary". When a user determines that the optional function is absolutely necessary, the user is classified into the A evaluation.

The B evaluation indicates an evaluation that the necessity degree of the optional function is "necessary". When a user determines that the optional function is necessary, the user is classified into the B evaluation.

The C evaluation indicates an evaluation that the necessity degree of the optional function is "unnecessary". When a user evaluates that the optional function is unnecessary, the user is classified into the C evaluation.

The evaluation result includes the number of users and user IDs of the users who made the evaluations. The number of users and the user IDs are recorded for each of the evaluation values. That is, the number of users who made the A evaluation and user IDs of the users who made the A evaluation are registered in the second database 65 in association with the evaluation value of the A evaluation. The same applies to the B evaluation and the C evaluation.

The processor 70 is an arithmetic processing device configured by a CPU (Central Processing Unit) or an MPU (Micro Processing Unit). The processor 70 executes a control program 61 and controls the units of the multifunction peripheral 1.

Figure 4:
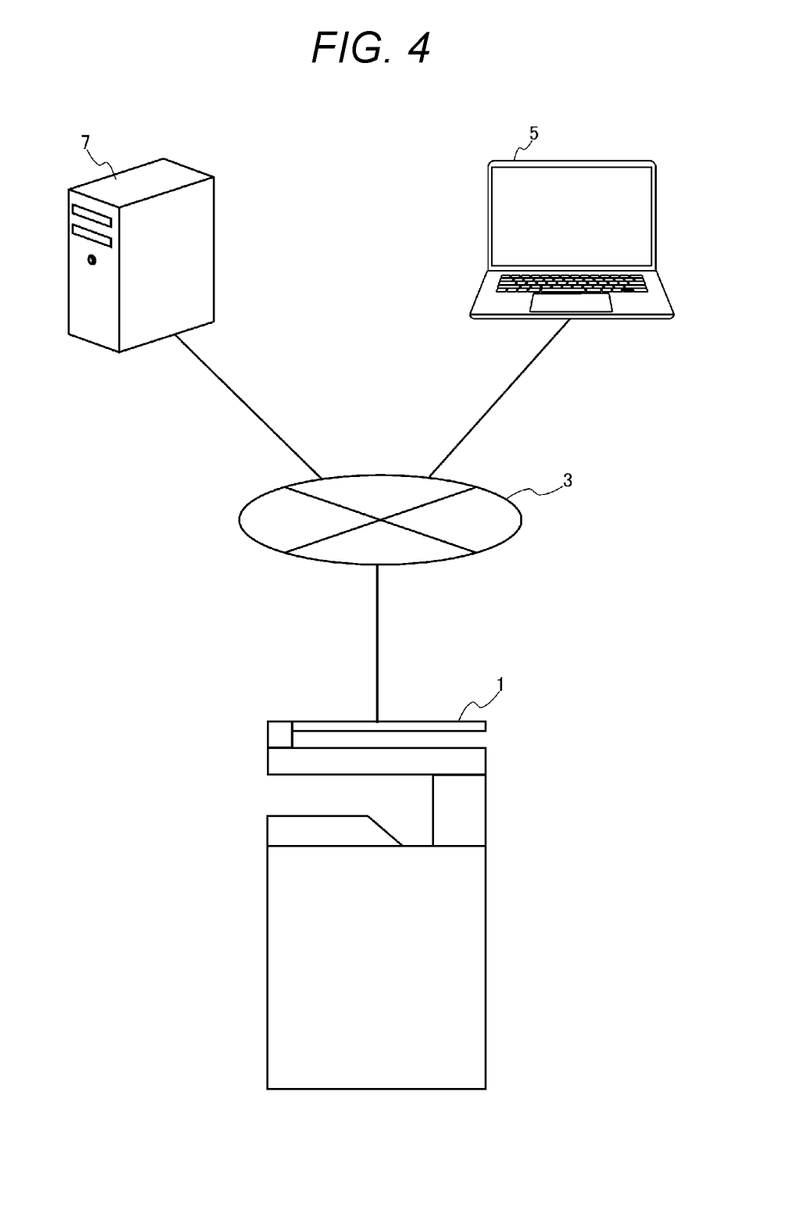
FIG. 4 is a diagram showing a system configuration of a system including the multifunction peripheral.

FIG. 4 is a diagram showing a system configuration of a system including the multifunction peripheral 1.

The multifunction peripheral 1 is connected to an administrator terminal 5 and a server device 7 via a network 3.

The administrator terminal 5 is a terminal such as a personal computer or a tablet personal computer used by the administrator. The administrator can refer to evaluation results of optional functions registered in the second database 65 using the administrator terminal 5.

The server device 7 is a device provided by a vendor of the multifunction peripheral 1. The administrator can access the server device 7 and additionally purchase an optional function of the multifunction peripheral 1.

Subsequently, the operation of the control unit 50 is explained.

When using the multifunction peripheral 1, first, the user inputs login information with the operation panel 20. The control unit 50 performs user authentication for determining whether the input login information coincides with login information of the registered user registered in the first database 63.

When the input login information does not coincide with the login information of the registered user registered in the first database 63, the control unit 50 displays an authentication error on the operation panel 20. At this time, the control unit 50 may cause the operation panel 20 to display guidance for checking whether the user has finished user registration and guidance for the user registration.

Figure 5:
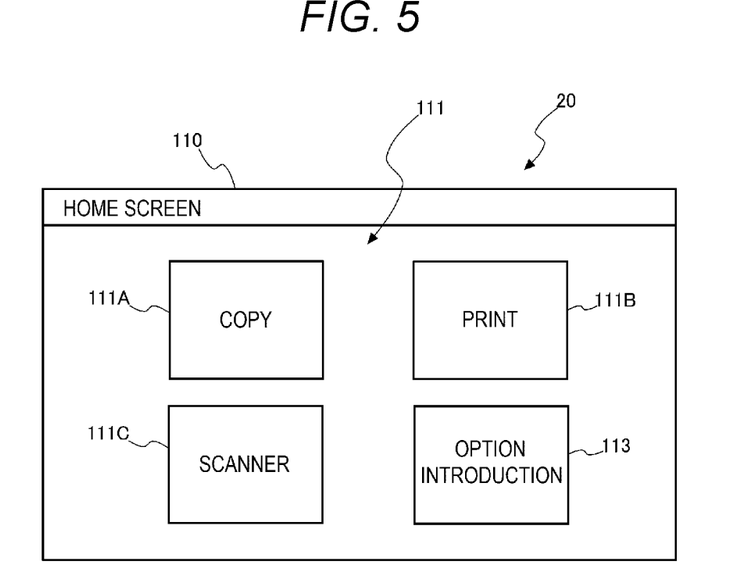
FIG. 5 is a diagram showing an example of a home screen.

FIG. 5 is a diagram showing an example of a home screen 110.

When the input login information coincides with the login information of the registered user registered in the first database 63, the control unit 50 causes the operation panel 20 to display the home screen 110. On the home screen 110, function selection buttons 111 for selecting a function that the user causes the multifunction peripheral 1 to execute, an option introduction button 113 for requesting introduction of an optional function, and the like are provided. The function selection buttons 111 include, for example, a copy selection button 111A, a print selection button 111B, and a scanner selection button 111C.

Figure 6:
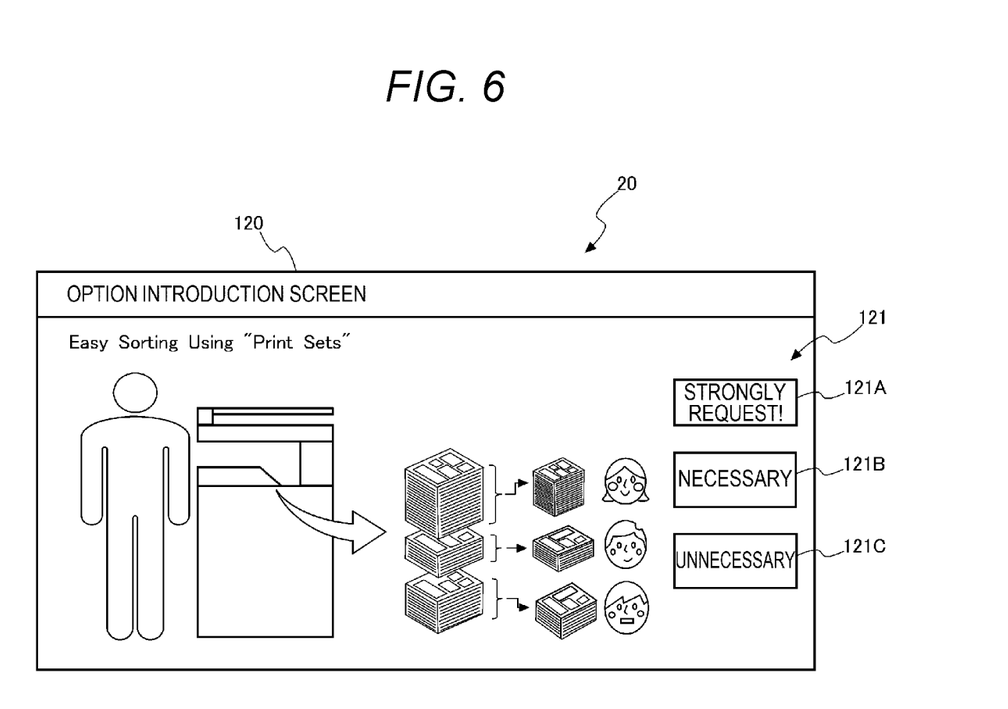
FIG. 6 is a diagram showing an example of an option introduction screen.

FIG. 6 is a diagram showing an example of an option introduction screen 120.

When the option introduction button 113 is pressed by a user, the control unit 50 causes the operation panel 20 to display the option introduction screen 120 shown in FIG. 6.

On the option introduction screen 120, an image for introducing an optional function unmounted on the multifunction peripheral 1 and not evaluated by a logging-in user is displayed. The image may be a still image or may be a moving image. The introduction of the optional function may be introduction by a text or may include an image.

On the option introduction screen 120, evaluation buttons 121 with which the user inputs an evaluation are displayed. The evaluation buttons 121 include an evaluation button 121A, an evaluation button 121B, and an evaluation button 121C.

The evaluation button 121A is a button that the user presses when the user evaluates the optional function introduced on the option introduction screen 120 as "absolutely necessary". When the evaluation button 121A is pressed, the control unit 50 determines that the user has made the A evaluation of the optional function and records a user ID of the user in a record in which an evaluation result is the A evaluation.

The evaluation button 121B is a button that the user presses when the user evaluates the optional function introduced on the option introduction screen 120 as "necessary". When the evaluation button 121B is pressed, the control unit 50 determines that the user has made the B evaluation of the optional function and records the user ID of the user in a record in which an evaluation result is the B evaluation.

The evaluation button 121C is a button that the user presses when the user evaluates the optional function introduced on the option introduction screen 120 as "unnecessary". When the evaluation button 121C is pressed, the control unit 50 determines that the user has made the C evaluation of the optional function and records the user ID of the user in a record in which an evaluation result is the C evaluation.

On the evaluation button 121A shown in FIG. 6, "Strongly request!" is displayed as a text corresponding to "absolutely necessary". In this way, on the evaluation buttons 121, different texts corresponding to "absolutely necessary", "necessary", and "unnecessary" may be displayed.

When any one of the function selection buttons 111 shown in FIG. 5 is pressed, the control unit 50 causes the operation panel 20 to display a setting screen for a function corresponding to the pressed function selection button 111. For example, when the pressed function selection button 111 is the print selection button 111B, settings of the number of prints, duplex printing, simplex printing, color printing, monochrome printing, and the like are displayed on the setting screen. Besides, the control unit 50 may cause the operation panel 20 to display an introduction button for introducing an optional function of the function corresponding to the function selection button 111. For example, when the print selection button 111B is pressed as the function selection button 111, the control unit 50 may display an introduction button for introducing an optional function unmounted on the multifunction peripheral 1 on the setting screen for the printing in relation to the printing.

While the multifunction peripheral 1 is executing processing after the setting of the setting screen is completed, the control unit 50 may cause the operation panel 20 to display the option introduction screen 120 for an optional function not evaluated by a logging-in user and unmounted on the multifunction peripheral 1.

For example, the control unit 50 counts the number of times a relevant user used the multifunction peripheral 1, that is, the number of times of login after the control unit 50 caused the operation panel 20 to display the option introduction screen 120 last time. When determining that the number of times the relevant user used the multifunction peripheral 1 is equal to or larger than a preset number of times, the control unit 50 causes the operation panel 20 to display the option introduction screen 120 for an unevaluated optional function.

When an optional function is purchased and additionally mounted on the multifunction peripheral 1, the control unit 50 may cause the operation panel 20 to display the evaluation buttons 121 for evaluating the added optional function.

In this case, on the operation panel 20, buttons on which texts such as "very good", "good", "not so bad" are displayed are displayed. The control unit 50 causes the storing unit 60 to store an evaluation corresponding to a pressed evaluation button 121.

An evaluation target optional function to be evaluated by a user may be an optional function that the multifunction peripheral 1 is permitted to use for a limited period. That is, an evaluation can be received even for an optional function in a so-called trial period for having the user use the optional function only for a fixed period and recognize high usefulness of the optional function.

For example, the multifunction peripheral 1 receives a license key issued by the server device 7. The license key includes an identifier for identifying an optional function and information concerning an effective period in which use of the optional function is permitted.

The control unit 50 executes the received license key and sets the optional function effective only for a period designated by the license key. The control unit 50 causes the operation panel 20 to display the option introduction screen 120 shown in FIG. 6 for an optional function permitted to be used only for a fixed period and receives an evaluation from the user.

Figure 7:
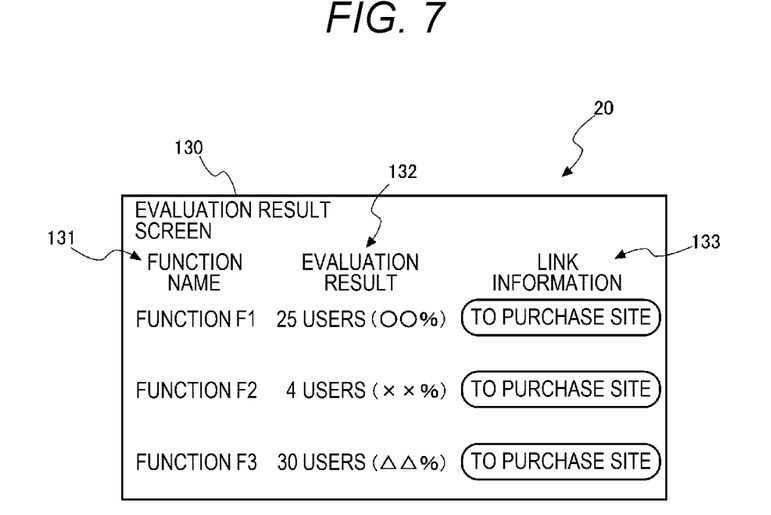
FIG. 7 is a diagram showing an example of an evaluation result screen.

FIG. 7 is a diagram showing an example of an evaluation result screen 130.

When receiving a reference request for an evaluation result from the administrator, the control unit 50 refers to the second database 65 and generates the evaluation result screen 130 in which evaluations of a plurality of users are aggregated. The evaluation result screen 130 is generated with, for example, data of a Web page browsable by a Web browser.

The evaluation result screen 130 includes function names 131 of optional functions, an evaluation result 132, and link information 133.

In FIG. 7, an example is shown in which the number of users who made the A evaluation and a ratio of the users who made the A evaluation to all users are displayed as the evaluation result 132. However, the numbers and the like of users who made the B evaluation and the C evaluation may be displayed. The numbers and the like of users who had all evaluation results of the A evaluation to the C evaluation may be simultaneously displayed.

The link information 133 is link information to a purchase site where an optional function indicated by a function name can be purchased. The administrator can access, by clicking the link information 133, the site where the optional function can be purchased. The site is a site provided by the server device 7.

The control unit 50 may transmit the generated evaluation result screen 130 to the server device 7 at a selling source of the multifunction peripheral 1. The selling source of the multifunction peripheral 1 can obtain an evaluation of the optional function and can smoothly proceed with processing between the user and the selling source.

Figure 8:
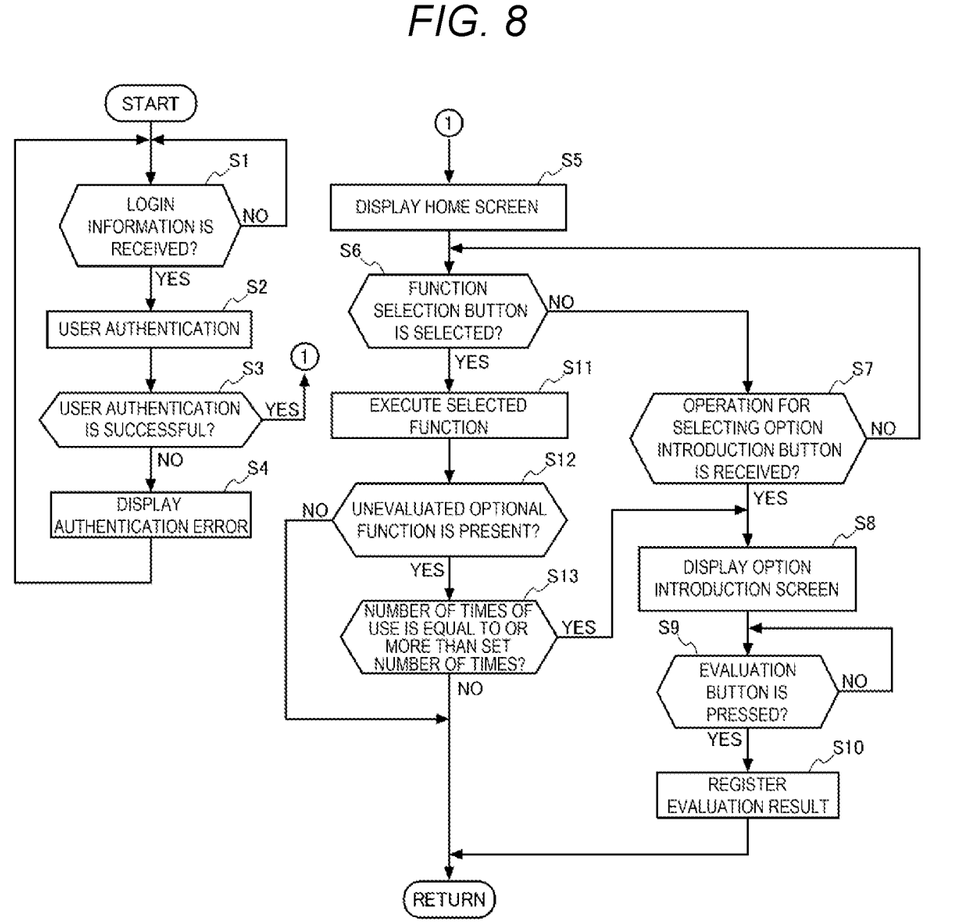
FIG. 8 is a flowchart showing the operation of the multifunction peripheral.
Figure 9:
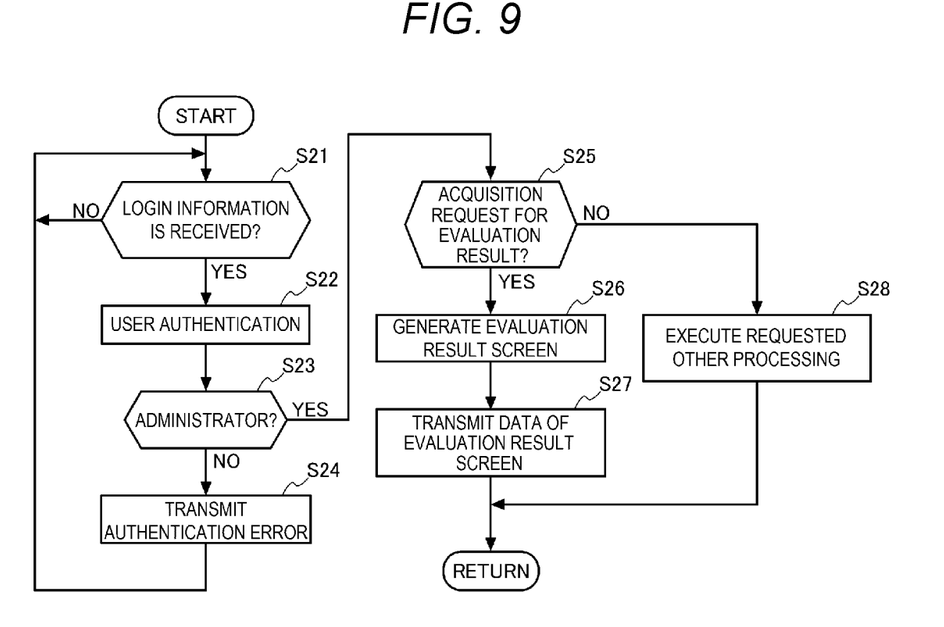
FIG. 9 is a flowchart showing the operation of the multifunction peripheral.

FIGS. 8 and 9 are flowcharts showing the operation of the multifunction peripheral 1.

The operation of the multifunction peripheral 1 is explained with reference to the flowcharts of in FIGS. 8 and 9.

First, the control unit 50 determines whether login information is received by the operation panel 20 (step S1). When login information is not received (NO in step S1), the control unit 50 stays on standby for a start of processing until login information is received.

When login information is received (YES in step S1), the control unit 50 executes user authentication based on a user ID and a password received as the login information (step S2). The control unit 50 determines whether the received user ID and the receive password coincide with a user ID and a password of the registered user registered in the first database 63. When the received user ID and the receive password do not coincide with the user ID and the password of the registered user, the control unit 50 determines that the user authentication is unsuccessful (NO in step S3) and displays an authentication error on the operation panel 20 (step S4). Thereafter, the control unit 50 returns to the determination in step S1.

When the received user ID and the receive password coincide with the user ID and the password of the registered user, the control unit 50 determines that the user authentication is successful (YES in step S3). When determining that the user authentication is successful, the control unit 50 causes the operation panel 20 to display the home screen 110 (step S5).

The control unit 50 determines whether operation for selecting any one of the function selection buttons 111 displayed on the home screen 110 is received (step S6). When the operation for selecting the function selection button 111 is not received (NO in step S6), the control unit 50 determines whether operation for selecting the option introduction button 113 is received (step S7).

When the operation for selecting the option introduction button 113 is not received (NO in step S7), the control unit 50 returns to the determination in step S6. When the operation for selecting the option introduction button 113 is received (YES in step S7), the control unit 50 causes the operation panel 20 to display the option introduction screen 120 (step S8). The control unit 50 determines whether the evaluation button 121 is pressed (step S9). When the evaluation button 121 is not pressed (NO in step S9), the control unit 50 stays on standby until the evaluation button 121 is pressed.

When the evaluation button 121 is pressed (YES in step S9), the control unit 50 registers, in a relevant record of the second database 65, an evaluation result corresponding to the pressed evaluation button 121 and a user ID of a logging-in user (step S10). Thereafter, the control unit 50 returns to the determination in step S1.

When the function selection button 111 is selected (YES in step S6), the control unit 50 causes the operation panel 20 to display a setting screen corresponding to the selected function selection button 111. Thereafter, when setting of the setting screen ends, the control unit 50 executes a function selected by the function selection button 111 (step S11).

The control unit 50 determines, during execution of a function such as printing, whether an unevaluated optional function not evaluated by the logging-in user is present (step S12). The unevaluated optional function may be an optional function relating to the printing function being executed. When an unevaluated optional function is absent (NO in step S12), the control unit 50 waits for an end of the function being executed and ends this processing flow.

When an unevaluated optional function is present (YES in step S12), the control unit 50 determines whether the number of times of use of the multifunction peripheral 1 by the logging-in user is equal to or more than a preset number of times (step S13). The control unit 50 determines whether the number of times of use of the multifunction peripheral 1 after the control unit 50 caused the operation panel 20 to display the option introduction screen 120 last time is equal to or more than the preset number of times (step S13).

When determining that the number of times of use of the multifunction peripheral 1 is not equal to or more than the preset number of times (NO in step S13), the control unit 50 waits for an end of the function being executed and ends this processing flow. When determining that the number of times of use of the multifunction peripheral 1 is equal to or more than the preset number of times (YES in step S13), the control unit 50 shifts to step S8 and performs the control in steps S8 to S10 explained above.

Subsequently, the operation of the multifunction peripheral 1 performed when an acquisition request for an evaluation result is received from the administrator is explained.

The control unit 50 determines whether login information is received from the administrator terminal 5 via the communication I/F 10 (step S21). When login information is not received (NO in step S21), the control unit 50 stays on standby for a start of processing until login information is received.

When login information is received (YES in step S21), the control unit 50 executes user authentication based on a user ID and a password received as the login information (step S22). The control unit 50 determines whether the received user ID and the received password coincide with a user ID and a password of the administrator registered in the first database 63. When the received user ID and the received password do not coincide with the user ID and the password of the administrator registered in the first database 63 (NO in step S23), the control unit 50 transmits an authentication error to the administrator terminal 5 (step S24).

When the received user ID and the received password coincide with the user ID and the password of the administrator registered in the first database 63 (YES in step S23), the control unit 50 determines whether an acquisition request for an evaluation result is received (step S25). When an acquisition request for an evaluation result is not received (NO in step S25), the control unit 50 executes other processing requested from the administrator terminal 5 (step S28) and returns to the determination in step S21.

When an acquisition request for an evaluation result is received from the administrator terminal 5 (YES in step S25), the control unit 50 refers to the second database 65 and generates the evaluation result screen 130 (step S26). The control unit 50 transmits the generated evaluation result screen 130 to the administrator terminal 5 (step S27).

As explained above, the multifunction peripheral 1 in this embodiment includes the control unit 50. The control unit 50 executes an operation explained below.

The control unit 50 determines whether input login information is login information of a registered user. When the login information is the login information of the registered user, the control unit 50 causes the operation panel 20 to display information concerning an optional function that can be added to the multifunction peripheral 1.

When receiving, with the operation panel 20, an evaluation of the user for the displayed optional function and receiving, with the communication I/F 10, an acquisition request for an evaluation for the optional function, the control unit 50 generates an evaluation result obtained by aggregating evaluations of a plurality of registered users.

The control unit 50 transmits the generated evaluation result to a transmission source of the acquisition request.

Therefore, when the user is using the multifunction peripheral 1 of this embodiment, the multifunction peripheral 1 causes the operation panel 20 to display information concerning the optional function and notifies the information concerning the optional function to the user. The multifunction peripheral 1 receives an evaluation of the user for the optional function and calculates an aggregation result obtained by aggregating evaluations of the users. The multifunction peripheral 1 transmits the calculated aggregation result to the transmission source of the acquisition request. Accordingly, it is possible to accurately grasp an optional function actually required by the user.

The evaluation result transmitted to the transmission source of the acquisition request includes the link information 133 to a site where the optional function can be purchased.

Therefore, the optional function can be easily purchased based on the evaluation result.

The causing the operation panel 20 to display information concerning an optional function that can be added to the multifunction peripheral 1 includes displaying, on the operation panel 20, a plurality of buttons indicating necessity degrees of the optional function.

The receiving, with the operation panel 20, an evaluation of the user for the optional function includes determining which of the plurality of buttons is selected and receiving an evaluation of the user.

Therefore, the user can reflect an intention of the user on purchase of the optional function simply by pressing the button corresponding to a necessity degree of the optional function.

The causing the operation panel 20 to display information concerning an optional function that can be added to the multifunction peripheral 1 includes, when the user is a user who has not evaluated the optional function, displaying, on the operation panel 20, information concerning the optional function every time the user uses the multifunction peripheral 1 a preset number of times.

Therefore, evaluations for the optional function can be obtained from a plurality of users.

The optional function for which an evaluation of the user is received by the operation panel 20 includes a function permitted to be used in the multifunction peripheral 1 only for a preset period.

Therefore, an evaluation of the user can be obtained for even an optional function permitted to be used in the multifunction peripheral 1 only for the preset period.

The operation of the control unit 50 further includes transmitting the evaluation result to a selling source of the multifunction peripheral 1.

Therefore, the selling source of the multifunction peripheral 1 can obtain the evaluation for the optional function and can smoothly proceed with processing between the user and the selling source.

The embodiment explained above indicates an aspect and can be optionally modified and applied.

For example, in the embodiment explained above, the evaluation result screen 130 including the function names 131, the evaluation result 132, and the link information 133 of the optional function is generated. However, various kinds of information such as account information, option expenses, and support information of the user may be displayed.

The units shown in FIG. 1 are examples and are not particularly limited. Hardware individually corresponding to the units does not always need to be mounted. It is also naturally possible to adopt a configuration in which one processor executes a program to realize the functions of the units. A part of functions realized by software may be realized by hardware or a part of functions realized by hardware may be realized by software. Besides, specific detailed components of the other units of the devices of the multifunction peripheral 1 can be optionally changed.

When an information management method is realized using the computer mounted on the multifunction peripheral 1, a program to be executed by the computer can also be configured in a form of a recording medium or a transmission medium for transmitting the program. A magnetic or optical recording medium or a semiconductor memory device can be used as the recording medium. Examples of the recording medium include portable and stationary recording media such as a flexible disk, a HDD (Hard Disk Drive), a CD-ROM, a DVD, a Blu-ray Disc, a magneto-optical disk, a flash memory, and a card-type recording medium. The recording medium may be a nonvolatile storage device such as a RAM, a ROM, or an HDD, which is an internal storage device included in the server device. Blu-ray is a registered trademark.

Step units of the operation shown in FIGS. 8 and 9 are divided according to main processing contents in order to facilitate understanding of the operations of the devices of the multifunction peripheral 1 and are not limited by a method of division and names of processing units. The step units may be divided into a larger number of step units according to the processing contents. One step unit may be divided to include a larger number of kinds of processing. The order of the steps may be changed as appropriate.

What is claimed is:

1. An information management method comprising:
   determining whether login information input from an operation panel of an image forming apparatus is login information of a registered user of a plurality of registered users;
   when the login information is the login information of the registered user, causing a display unit of the image forming apparatus to display information concerning an optional function that is added to the image forming apparatus,
      wherein the causing the display unit to display the information concerning the optional function includes displaying, on the display unit, a plurality of buttons indicating a plurality of necessity degrees of the optional function;
   receiving, with the operation panel, an evaluation of the registered user for the optional function displayed on the display unit,
      wherein the receiving, with the operation panel, the evaluation of the registered user for the optional function includes determining which of the plurality of buttons is selected and receiving the evaluation of the registered user;
   when receiving, with a communication circuit of the image forming apparatus, an acquisition request from a transmission source for an evaluation for the optional function, generating an evaluation result obtained by aggregating evaluations of the plurality of registered users; and
   transmitting the generated evaluation result to the transmission source of the acquisition request.

2. The information management method according to claim 1, wherein the evaluation result transmitted to the transmission source of the acquisition request includes link information to a site where the optional function is purchased.

3. The information management method according to claim 1, wherein the causing the display unit to display the information concerning the optional function that is added to the image forming apparatus includes, when the registered user is a user who does not evaluate the optional function, displaying, on the display unit, information concerning the optional function every time the user uses the image forming apparatus a preset number of times.

4. The information management method according to claim 1, wherein the optional function for which the evaluation of the registered user is received by the operation panel includes a function permitted to be used in the image forming apparatus only for a preset period.

5. The information management method according to claim 1, further comprising transmitting the evaluation result to a selling source of the image forming apparatus.

6. An image forming apparatus comprising:
   a communication circuit configured to perform communication with a specific apparatus via a network;
   an operation panel configured to receive login information;

a display unit; and
a control unit that executes:
  determining whether the login information received by the operation panel is login information of a registered user of a plurality of registered users;
  when the login information is the login information of the registered user, displaying, on the display unit, information concerning an optional function that is added to the image forming apparatus,
    wherein the displaying the information concerning the optional function includes displaying, on the display unit, a plurality of buttons indicating a plurality of necessity degrees of the optional function;
  receiving, with the operation panel, an evaluation of the registered user for the optional function displayed on the display unit,
    wherein the receiving, with the operation panel, the evaluation of the registered user for the optional function includes determining which of the plurality of buttons is selected and receiving the evaluation of the registered user;
  when receiving, with the communication circuit, an acquisition request from a transmission source for an evaluation for the optional function, generating an evaluation result obtained by aggregating evaluations of the plurality of registered users; and
  transmitting the generated evaluation result to the transmission source of the acquisition request.

7. An image forming apparatus comprising:
a communication circuit configured to perform communication with a specific apparatus via a network;
an operation panel configured to receive login information;
a display unit; and
a control unit that executes:
  determining whether the login information received by the operation panel is login information of a registered user of a plurality of registered users;
  when the login information is the login information of the registered user, displaying, on the display unit, information concerning an optional function that is added to the image forming apparatus;
  receiving, with the operation panel, a necessity degree of the registered user for the optional function displayed on the display unit;
  generating an evaluation result obtained by aggregating necessity degrees of the plurality of registered users; and
  transmitting the evaluation result to a selling source of the image forming apparatus.

* * * * *